(12) United States Patent
Ellis et al.

(10) Patent No.: US 7,461,183 B2
(45) Date of Patent: Dec. 2, 2008

(54) METHOD OF PROCESSING A CONTEXT FOR EXECUTION

(75) Inventors: Jackson Lloyd Ellis, Fort Collins, CO (US); Kurt Jay Kastein, Fort Collins, CO (US); Praveen Viraraghavan, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 604 days.

(21) Appl. No.: 10/910,000

(22) Filed: Aug. 3, 2004

(65) Prior Publication Data

US 2006/0031600 A1 Feb. 9, 2006

(51) Int. Cl.
*G06F 3/00* (2006.01)
*G06F 13/00* (2006.01)
(52) U.S. Cl. .............................. 710/35; 710/22; 710/52; 710/53; 710/56
(58) Field of Classification Search ...................... 710/5, 710/21, 22, 23, 35, 52, 57, 74, 100, 308, 710/56, 260, 105; 711/118, 171, 117, 112, 711/110, 105; 709/231, 232, 233, 250, 234, 709/230, 200; 714/811; 370/463, 413, 412, 370/230
See application file for complete search history.

(56) References Cited

U.S. PATENT DOCUMENTS

| | | | | |
|---|---|---|---|---|
| 5,307,459 A | * | 4/1994 | Petersen et al. ............. | 709/250 |
| 5,613,162 A | * | 3/1997 | Kabenjian ..................... | 710/22 |
| 5,732,286 A | * | 3/1998 | Leger ............................ | 710/57 |
| 5,740,466 A | * | 4/1998 | Geldman et al. ............... | 710/5 |
| 5,771,397 A | * | 6/1998 | Hospodor et al. ............. | 710/35 |
| 5,881,248 A | * | 3/1999 | Mergard ...................... | 710/100 |
| 5,892,979 A | * | 4/1999 | Shiraki et al. .................. | 710/52 |
| 5,968,147 A | * | 10/1999 | Polfer et al. ................... | 710/52 |
| 6,105,079 A | * | 8/2000 | Kuo et al. ....................... | 710/25 |
| 6,105,086 A | * | 8/2000 | Doolittle et al. ............... | 710/52 |

(Continued)

OTHER PUBLICATIONS

National Semiconductor, DP8390 Network Interface Controller: An Introductory Guide, May 1993, National Semiconductor, pp. 1-8.*

*Primary Examiner*—Matt Kim
*Assistant Examiner*—Cheng-Yuan Tseng
(74) *Attorney, Agent, or Firm*—Yee & Associates

(57) ABSTRACT

A method and apparatus in a data controller in a storage drive for retrieving, evaluating, and processing a context that describes a direct memory access (DMA) request. The data controller includes a buffer for storing data transferred in response to execution of a DMA transfer request, a host address pointer pointing to a current location in the buffer, and a retrieval channel device. The retrieval channel device is configured to: fetch a context that describes a DMA transfer requested by a host computer, determine whether a current capacity of the buffer for transferring data exceeds a threshold, generate an instruction to transfer a second amount of data to complete at least a portion of the requested DMA transfer if the current capacity does exceed the threshold, assert the instruction generated by the retrieval channel device, and adjust the host address pointer by the second amount of data.

24 Claims, 10 Drawing Sheets

U.S. PATENT DOCUMENTS

| | | | | |
|---|---|---|---|---|
| 6,145,033 | A * | 11/2000 | Chee | 710/57 |
| 6,351,780 | B1 * | 2/2002 | Ecclesine | 710/22 |
| 6,370,611 | B1 * | 4/2002 | Callison et al. | 711/105 |
| 7,286,549 | B2 * | 10/2007 | Gaur | 370/412 |
| 2003/0056059 | A1 * | 3/2003 | Fox et al. | 711/112 |
| 2005/0147110 | A1 * | 7/2005 | Connor | 370/412 |
| 2005/0223135 | A1 * | 10/2005 | Kotani | 710/22 |
| 2005/0289254 | A1 * | 12/2005 | Chien | 710/52 |
| 2006/0004904 | A1 * | 1/2006 | Sarangam et al. | 709/200 |
| 2006/0010260 | A1 * | 1/2006 | Fung | 710/22 |

* cited by examiner

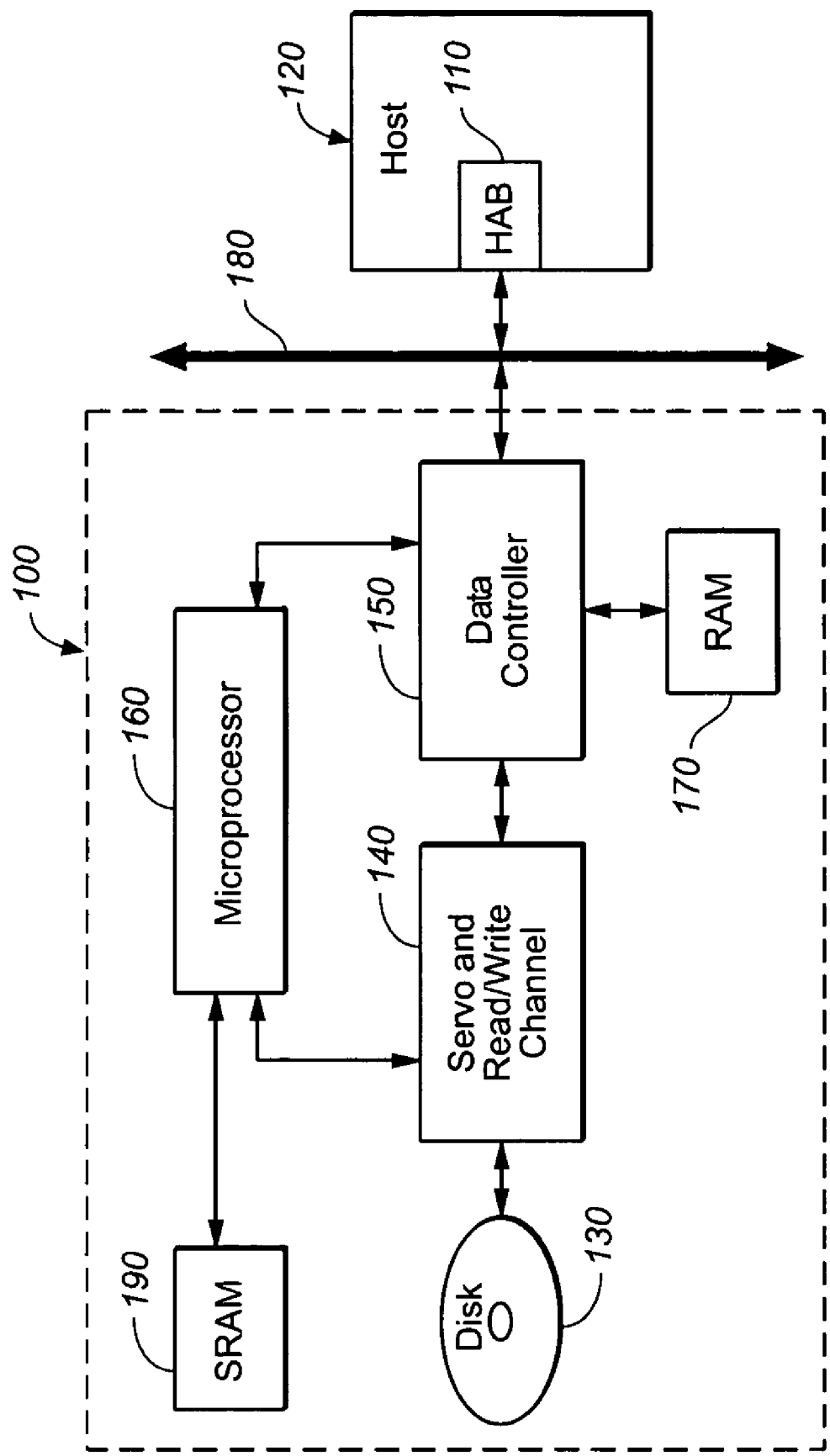
FIG._1

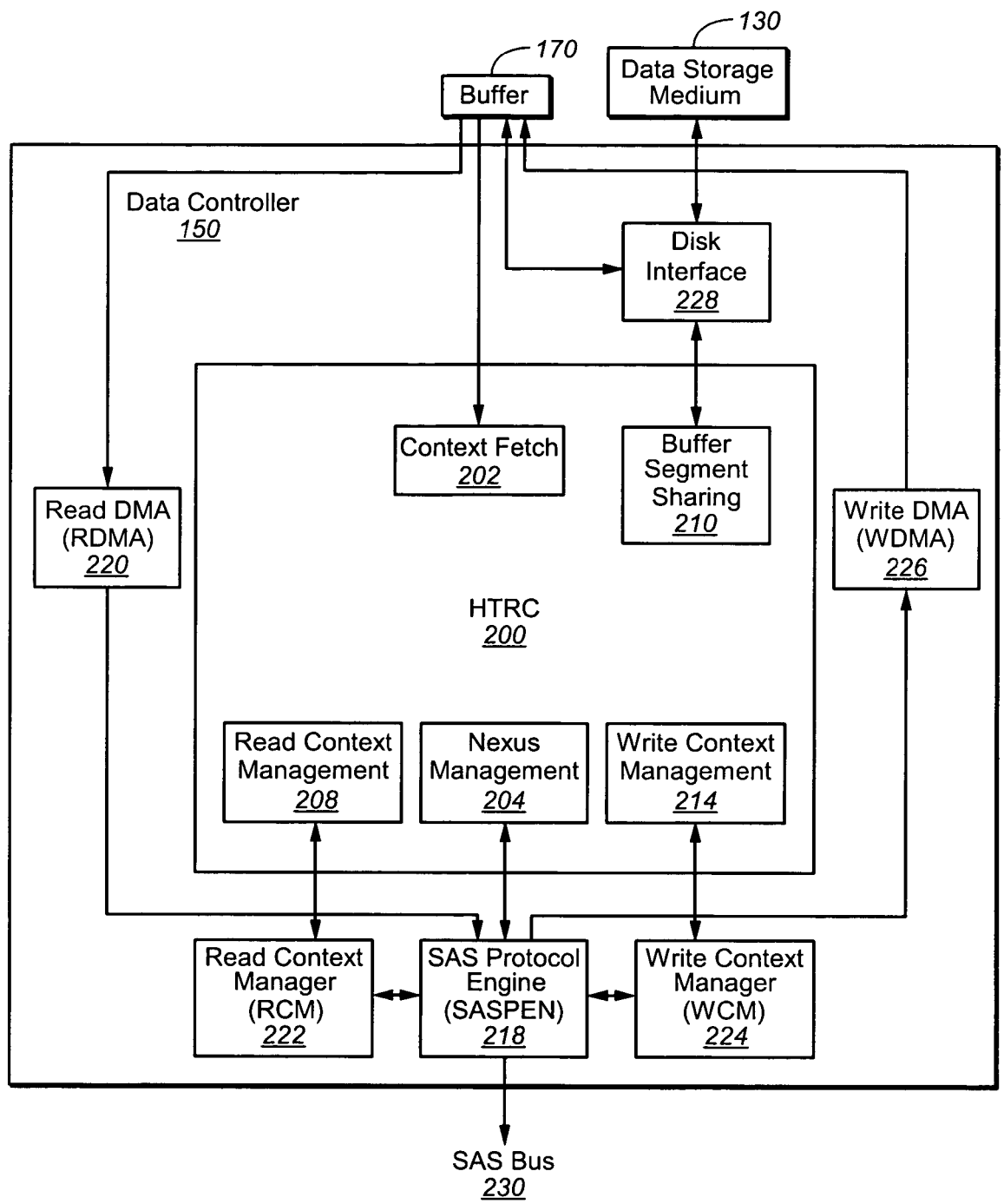
FIG._2

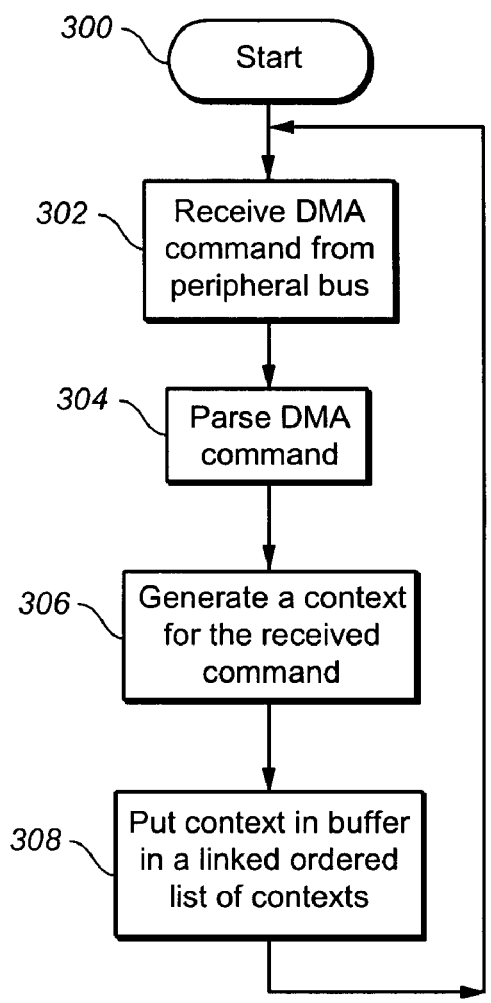
FIG._ 3
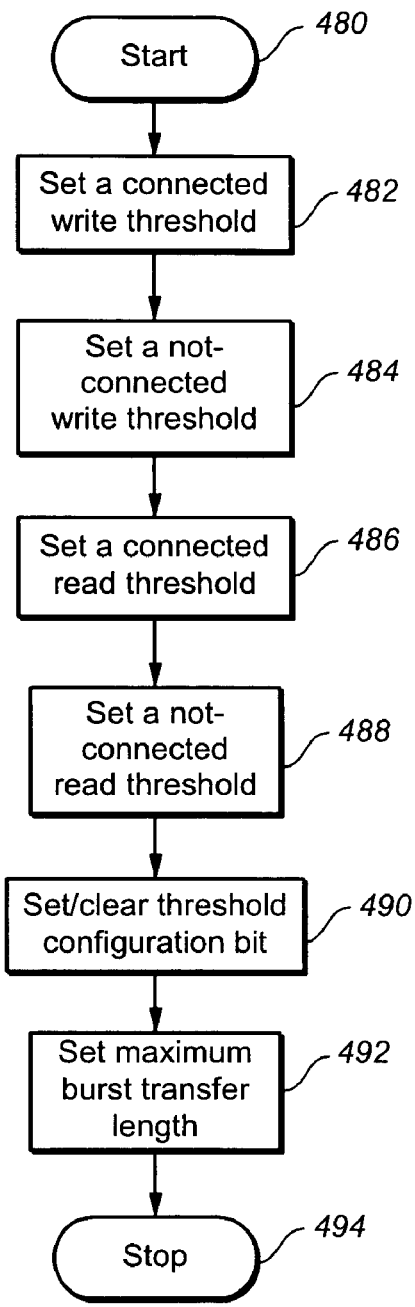
FIG._ 4E

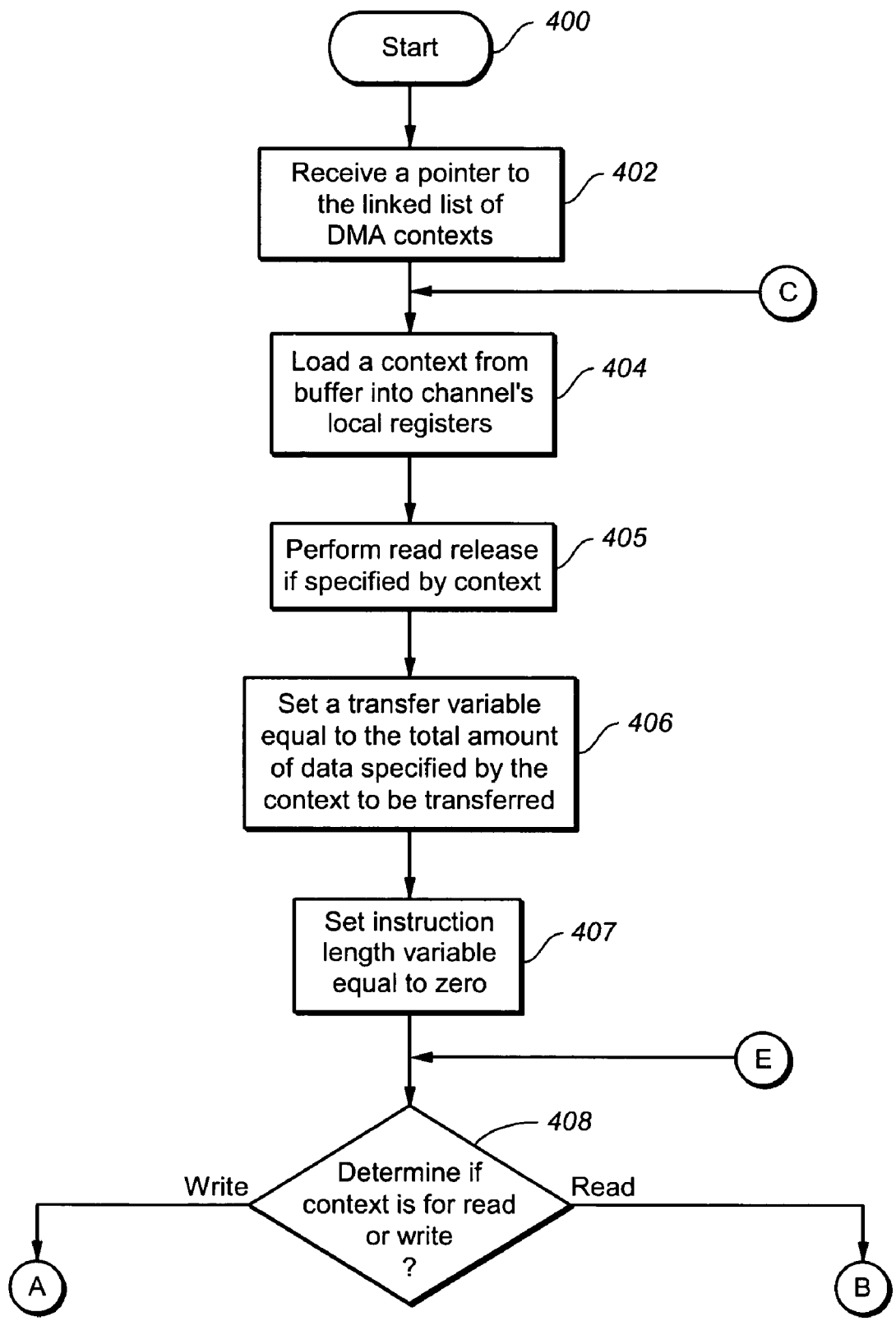
FIG._4A

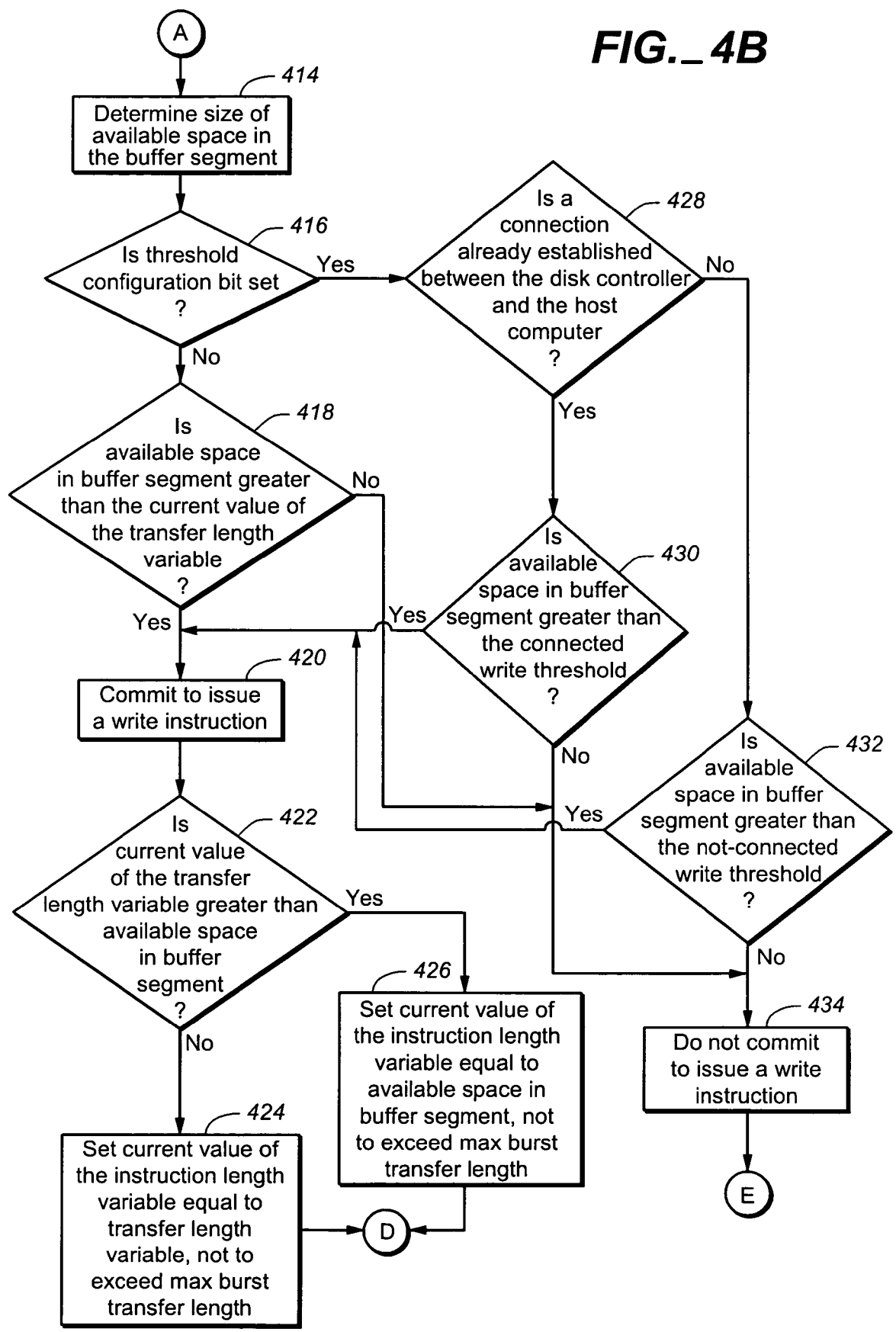
FIG._4B

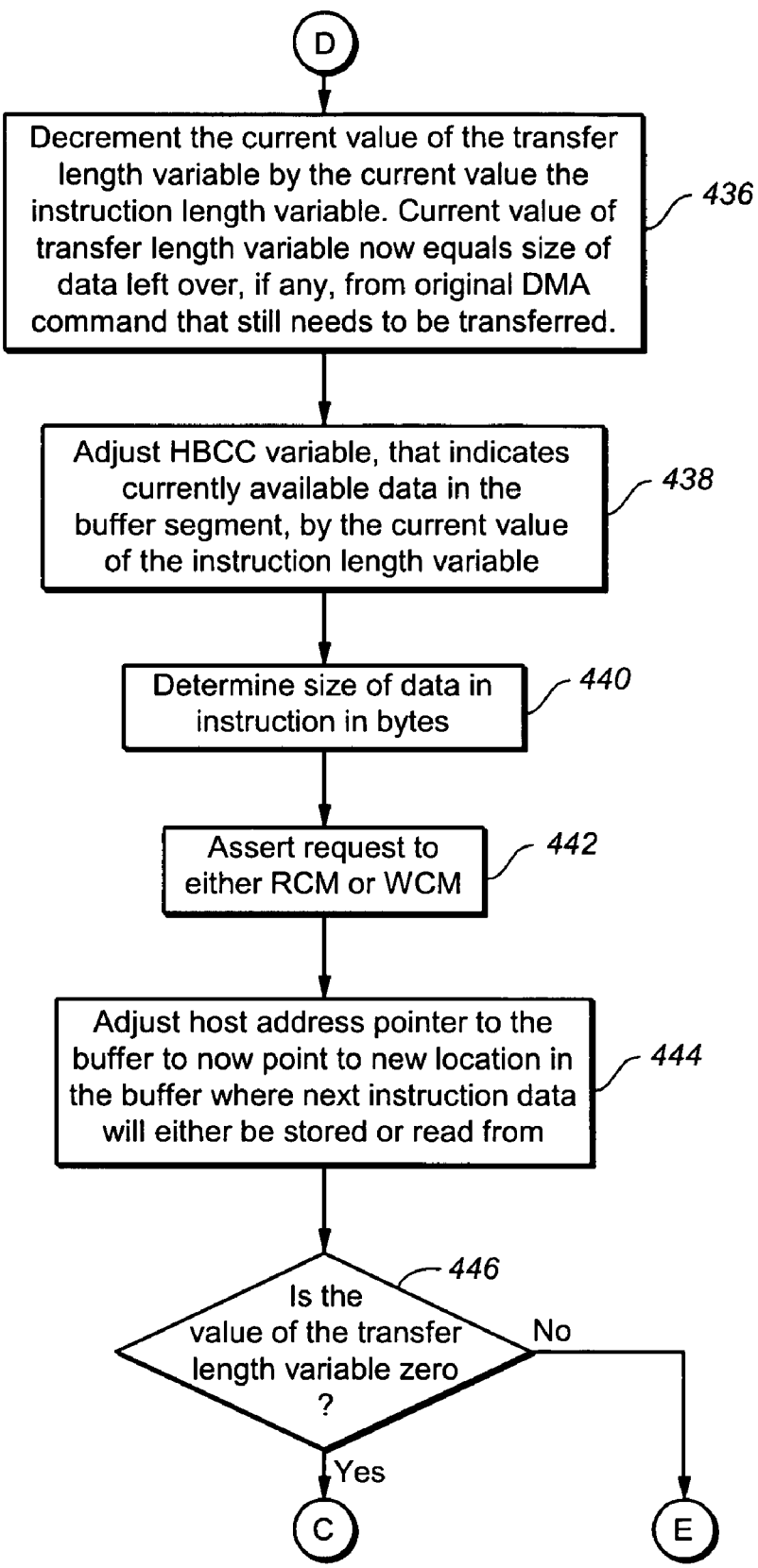
FIG._4C

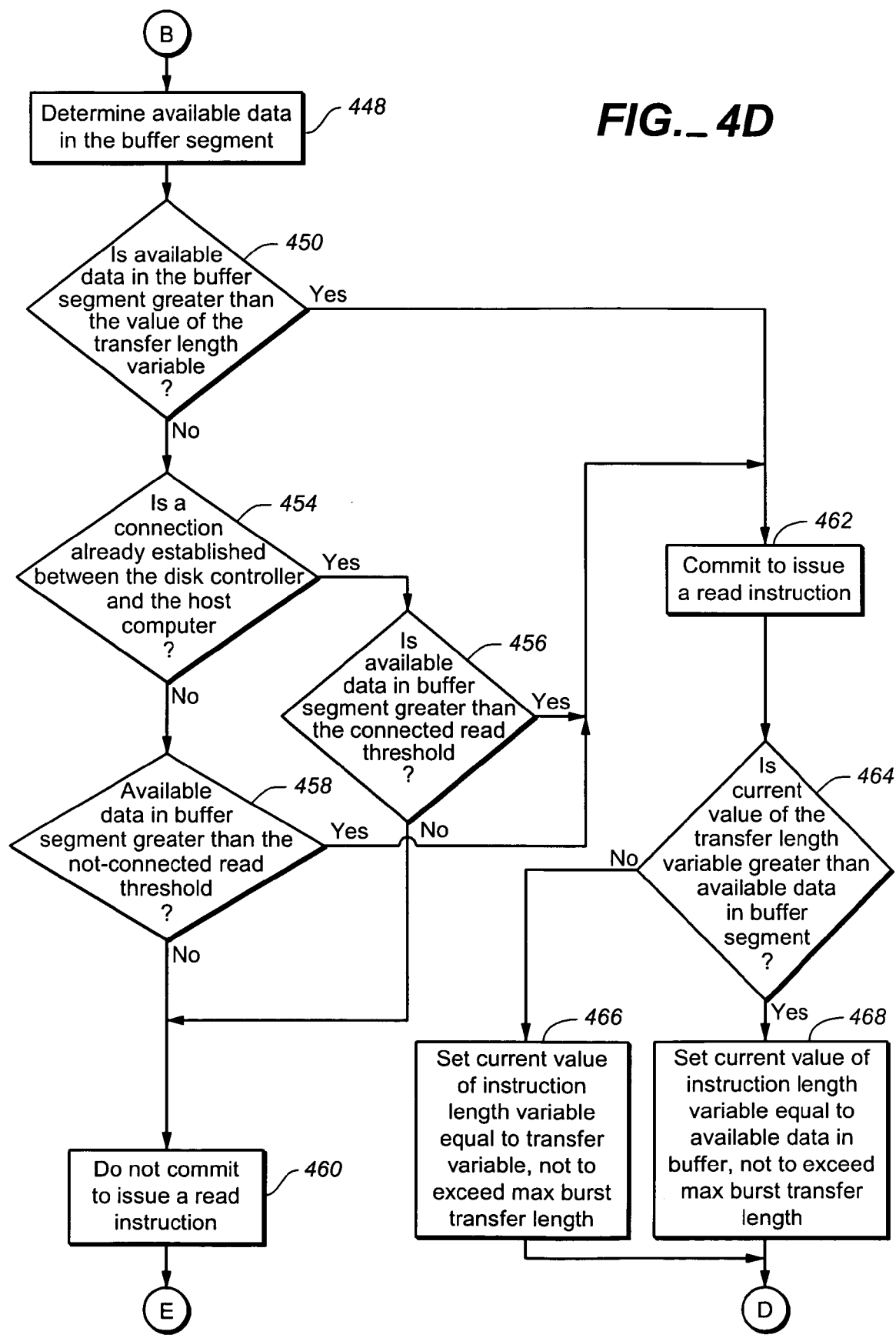
FIG._4D

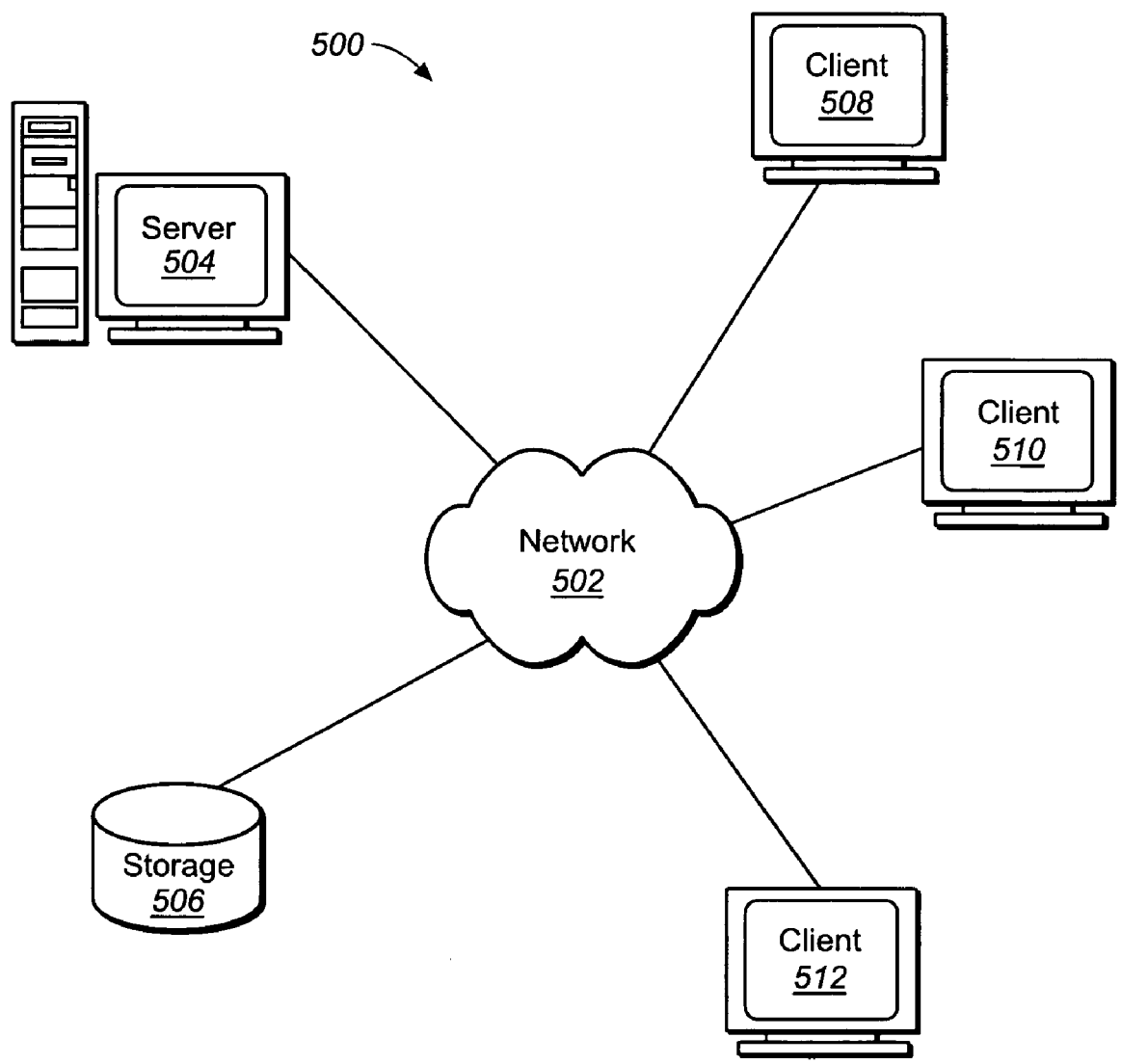
FIG._5

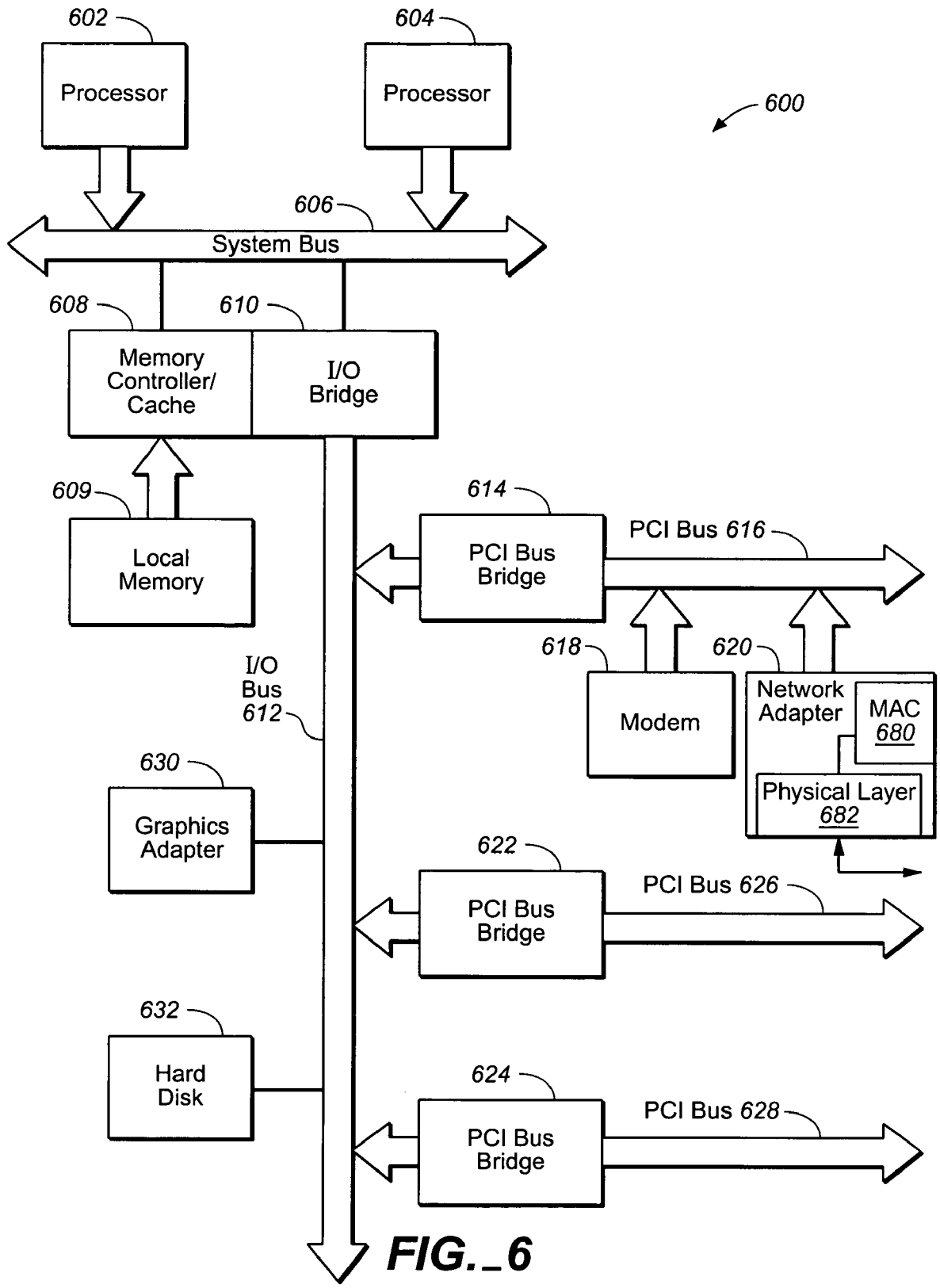
FIG._6

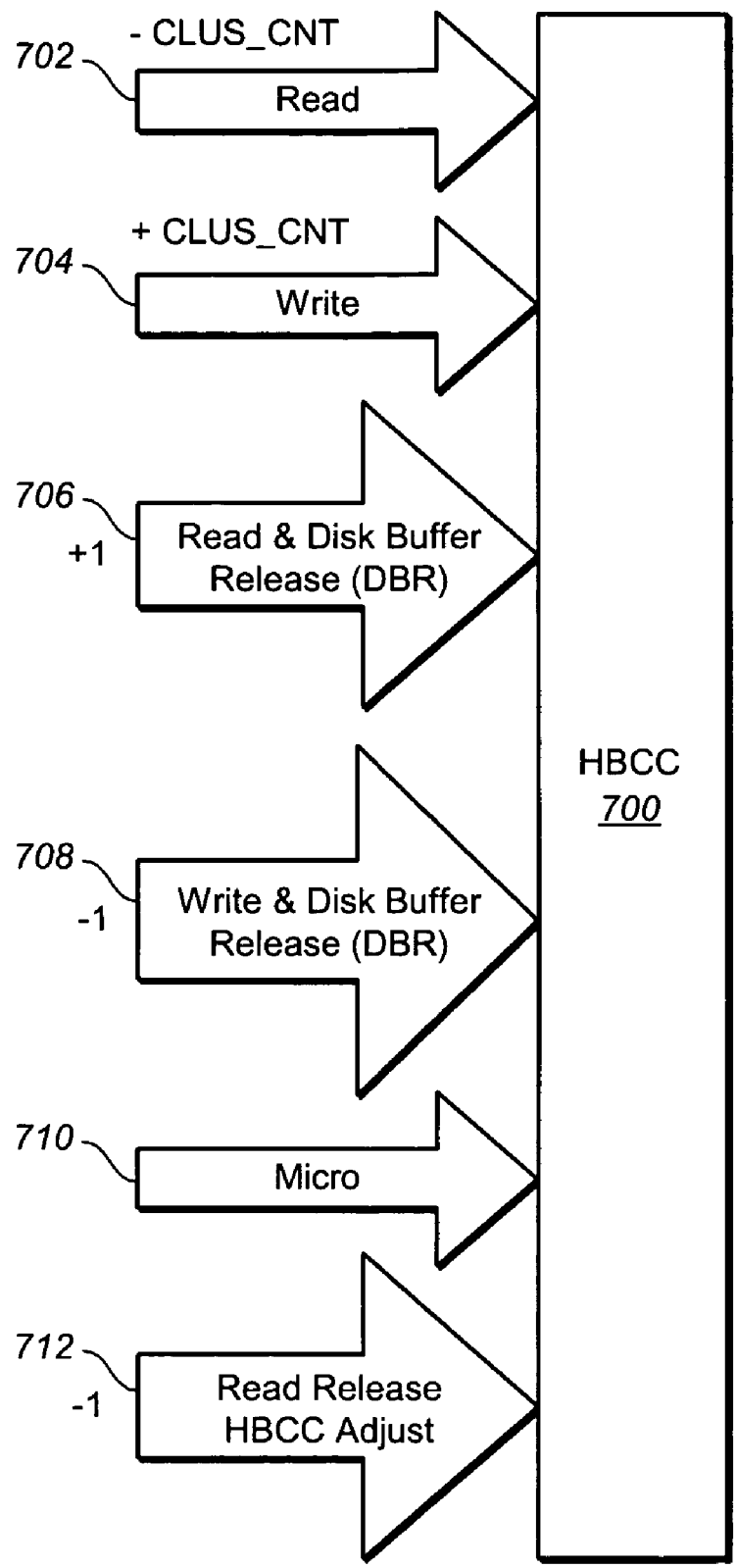
*FIG._7*

METHOD OF PROCESSING A CONTEXT FOR EXECUTION

BACKGROUND OF THE INVENTION

1. Technical Field

The present invention is directed generally toward an improved data storage device. More particularly, the present invention relates to a method and apparatus in a data controller, that is included within a storage drive, for retrieving, evaluating, and processing a context that describes a direct memory access (DMA) request to transfer data between the storage drive and a host computer to which the storage drive is coupled.

2. Description of the Related Art

Contexts are known in the art. A context is generated for each DMA request to transfer data between a storage drive and a host computer to which the drive is coupled. The context includes all of the information that is necessary in order for a disk controller included in the drive to program a DMA transfer, whether that transfer is a read or a write. The context typically describes whether the transfer is to be a read or write to the drive, the length of the data to be transferred, and the current location of the data to be read or the space in the buffer where the data is to be written.

In order to transfer data between a storage drive and a host computer, an active protocol bus connection must exist between the drive and the computer. Thus, the drive and computer must have established an active communications link by completing the necessary handshaking process defined by the protocol. Once this handshaking process is successfully completed, an active link is open and data transmission between the disk and computer can begin.

There is computing overhead associated with establishing an active communications link. It is more efficient to transfer as much data as possible while a link is open instead of terminating one link, reestablishing another active link, and then transferring additional data.

The most efficient manner of executing a DMA request is to transfer all of the requested data at one time using one transfer instruction. This is typically not possible, however. The data is staged within the drive in a buffer for temporary storage as the data is transferred. This buffer may not be large enough to hold all of the requested data because only a segment of the buffer is allocated for use by any given DMA request. Thus, the space that is currently available in the buffer to be used for a particular DMA request will change dynamically as data is written into the buffer thus taking up buffer space or read from the buffer thus releasing space which causes buffer space to become available. When a DMA request is for an amount larger than the available space in a buffer segment, one solution is to divide the original single DMA request into multiple DMA requests so that the original single DMA request is executed in several smaller transfer instructions. Often a threshold is compared against the amount of space or data available in the buffer segment to define when it is most efficient to issue one of these smaller transfer instructions. Each transfer instruction is passed to a protocol block, which opens a communications link. The transfer instruction is then passed to a data movement block, often called a DMA block, to physically transfer the data to/from the buffer using the opened communications link. After the data movement for this instruction is complete, some information within the data movement block, including a buffer address pointer, is remembered and used as part of the next transfer instruction. This information is therefore not known until the data movement for the first transfer instruction has completed. This can provide a delay in cases where this information is needed to prepare the next instruction. As a result, this can impact performance, for example, by requiring that a communications link be opened for each one of these smaller requests and then closed after each one of the smaller requests is executed. Thus, for example, if an original DMA request is divided into three smaller requests, a communications link would be opened and closed three times.

Similarly, multiple related DMA requests may be received and queued into a single list to be executed. These DMA requests may be related, for example, by requesting data that is available in sequential locations in the buffer. These DMA requests may each be for a small amount of data, such that the data for multiple requests can all be stored in the buffer segment at the same moment. The most efficient manner of executing these DMA requests would be to open a single communications link, transfer the data for these multiple DMA requests, and then close the communications link. However, if feedback from the data movement block is needed to prepare each instruction, then delays occur on the communications link, and it may become more efficient to close the link between these instructions. Thus, for example, if three original DMA requests were received, a communications link would be opened and closed three times to avoid using the link inefficiently.

In new communication link protocols, the overhead to open a link is becoming less and more devices are needing to share the bandwidth of the link. As a result, inefficient use of the open communication link is less acceptable.

A need exists for a method and apparatus that will maximize the use of an established communications link when a DMA request is received by transmitting as much data as possible using the open link.

SUMMARY OF THE INVENTION

The present invention is a method and apparatus in a data controller in a storage drive for retrieving, evaluating, and processing a context that describes a direct memory access (DMA) request. The data controller includes a buffer for storing data transferred in response to execution of a direct memory access (DMA) transfer request, a host address pointer pointing to a current location in the buffer, and a retrieval channel device included in the data controller. The retrieval channel device is configured to: (1) fetch a context that describes a direct memory access (DMA) transfer requested by the host computer to which the storage drive is coupled, where the DMA requests a transfer of a particular amount of data, (2) determine whether a current capacity of the buffer for transferring data exceeds a threshold, (3) generate an instruction to transfer an amount of data to complete all or a portion of the requested DMA transfer in response to the retrieval channel device determining that the current capacity does exceed the threshold, (4) assert the instruction generated by the retrieval channel device, and (5) adjust the host address pointer by the amount of data, all without feedback from any data movement block.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a host computer that is coupled to a peripheral device, such as a CD-ROM or a hard disk drive, that includes a data controller in which the present invention is implemented in accordance with the present invention;

FIG. 2 illustrates a device, included within a data controller, in which the present invention is implemented in accordance with the present invention;

FIG. 3 depicts a high level flow chart that illustrates a data controller receiving a direct memory access (DMA) request from the host computer and generating a context for that request in accordance with the present invention;

FIGS. 4A through 4D together illustrate a high level flow chart that depicts the device of FIG. 2 efficiently processing DMA contexts in accordance with the present invention;

FIG. 4E illustrates a flow chart that depicts setting thresholds in accordance with the present invention;

FIG. 5 depicts a network data processing system which includes the present invention in accordance with the present invention;

FIG. 6 is a block diagram that illustrates a host computer system that includes the present invention in accordance with the present invention; and FIG. 7 is a block diagram of a counter that is used as a host buffer contents counter (HBCC) in accordance with the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

The present invention is a device within a disk data controller in a disk drive, such as a hard disk drive or CD-ROM drive. The device is referred to herein as a host thread retrieval channel (HTRC). The HTRC is responsible for retrieving, evaluating, and starting the processing of a context. The HTRC retrieves, from a list, contexts that are associated with DMA transfers that are to be performed between a host computer and the disk drive that includes the disk controller that includes the HTRC. The HTRC receives contexts associated with DMA requests and then asserts instructions within the disk controller that, when executed, will cause data to be transferred. Each instruction asserted by the HTRC is a copy of the context being processed in the HTRC with the exception that the specified transfer length in the instruction is a subset of the context's remaining transfer length.

The disk controller may include one or more such HTRC devices. In accordance with a preferred embodiment, a disk controller will include three HTRCs. Each HTRC is capable of operating independently from the other HTRCs. Thus, a disk controller that includes three HTRCs will be capable of concurrently processing three different context lists.

According to the present invention, the HTRC will retrieve a context for processing and determine the size of the data requested to be transferred by the DMA request between the disk and the host computer.

Transfer thresholds are preset. The HTRC determines the current capacity of the buffer segment that can be used for transferring data. If the current capacity of the buffer segment does not exceed the threshold, the HTRC will not commit to issue a transfer instruction until the threshold is exceeded. Once the threshold is exceeded, the HTRC commits to issue a transfer instruction. The HTRC then determines the size of data that will be transferred by the transfer instruction and asserts the instruction to the appropriate read or write context manager. The context manager will then respond by executing the instruction so that the size of data specified by the instruction is transferred. The HTRC then adjusts the pointer into the buffer which is used to stage data as it is transferred.

Several variables are described herein:

The transfer length (TransferLen) variable is the size of the data that is to be transferred. When a context is first fetched, the transfer length variable is equal to the total size of data to be transferred by the DMA command.

The cluster count (ClusCnt) variable is the size of the data that will be transferred in response to an instruction asserted by the HTRC. The cluster count is also referred to herein as an instruction length variable.

A segment size (SegSize) variable defines the size in sectors of a buffer segment. A buffer segment is the part of the total buffer that has been assigned for use by the current DMA transfer which is being managed by the HTRC. On a write, data is transferred into the buffer segment. On a read, data is transferred from the buffer segment. According to the preferred embodiment, the buffer is the SDRAM memory device 170.

A not-connected write threshold is a threshold that is used when a DMA write has been requested by the host and the host computer and drive do not have an active communications link currently established.

A connected write threshold is a threshold that is used when a DMA write has been requested by the host when the host computer and drive do have an active communications link currently established. The connected write threshold will typically be set lower than the not-connected write threshold.

A not-connected read threshold is a threshold that is used when a DMA read has been requested by the host and the host computer and drive do not have an active communications link currently established.

A connected read threshold is a threshold that is used when a DMA read has been requested by the host when the host computer and drive do have an active communications link currently established. The connected read threshold will typically be set lower than the not-connected read threshold.

A variable that indicates the amount of data that is currently stored in the buffer segment is defined. This variable is referred to herein as a Host Buffer Contents Counter (HBCC).

A sector size (SectorSize) variable is defined that indicates the number of bytes of buffer space that are accounted for in each sector of a transfer.

A sector count (SecCnt) variable is defined that tracks which portion of the sector in bytes has been transferred.

A maximum burst transfer length is specified which defines the upper limit of data that the protocol will permit to be transferred.

FIG. 1 depicts a host computer 120 that is coupled to a peripheral device 100, such as a CD-ROM or a hard disk drive, that includes a data controller 150 in which the present invention is implemented in accordance with the present invention.

A data controller 150 is included in the electronics of peripheral device 100. Peripheral device 100 is coupled to a host adapter board ("HAB") 110 included in host computer 120. Peripheral device 100 includes a data storage medium 130 that is coupled to a servo and read/write channel 140. Servo and read/write channel 140 is coupled to a data controller 150 and a microprocessor 160. Data controller 150 is coupled to buffer memory illustrated as a RAM 170 and a peripheral bus 180. Another memory, shown as SRAM 190, is coupled to microprocessor 160 as local storage.

The general function of data controller 150 is to process commands from a requester or initiator, such as host computer 120. Host computer 120 can be a personal computer, workstation, server or other peripheral device. Data controller 150 performs data transfers associated to those commands with the data storage medium 130 of peripheral 100, e.g., magnetic or optical disk. In more detail, data controller 150 processes the commands to configure itself for the associated data transfers. The commands may not request data transfers, but may request status of the peripheral device. Data controller 150 must also process these commands.

The data controller 150 may be coupled to multiple host computers. Or the data controller 150 may be coupled to multiple host adapter board 110 devices within a single host computer 120. The data controller 150 may contain multiple read and write commands from these multiple sources at the same moment. In this case, the context within the data controller 150 can represent which host computer 120 or host adapter board 110 has provided the request represented by the context. Within the description of this invention, host computer is used as a generic term to refer to the specific host computer 120 or host adaptor board 110 which provided the read or write command represented by the current context being processed.

Different bus architectures and protocols exist for peripheral bus 180 that provide the commands. Such architecture and protocols are defined by, for example, ATA, ISA, IDE, USB, SCSI, SAS and Fibre Channel. For example, a SCSI command known as control descriptor block ("CDB") includes an operational code consisting of a group code and a command code, a logical unit number, logical block addresses (LBAs) if required, a transfer length value if required and a control byte. The transfer length value specifies the number of blocks (or other data units) that are to be transferred with an associated command. Thus, data controller 150 must be able to at least process one of those command protocols. These commands, which request for the data controller to transfer read data or write data, are referred to here-in as DMA commands.

FIG. 2 illustrates a device 200, included within a disk data controller 150, in which the present invention is implemented in accordance with the present invention. Device 200 is referred to herein as a Host Thread Retrieval Channel (HTRC). HTRC 200 includes a context fetch 202 mechanism for fetching contexts from a buffer 170, a nexus management 204 coupled to a SAS Protocol Engine (SASPEN) 218, a read context management mechanism 208 coupled to a read context manager 222, a buffer segment sharing mechanism 210 coupled to a disk interface 228, and a write context management mechanism 214 coupled to a write context manager 224. Read context manager 222 is coupled to a read DMA 220. Write context manager 214 is coupled to a write DMA 226. SASPEN 204 is coupled to a SAS bus 230.

Each HTRC 200 has a read context management mechanism 208 and a write context management mechanism 214. These blocks perform the flow diagram illustrated by FIGS. 4A through 4D. Each HTRC 200 also has a nexus management 204 which determines whether the communications protocol connection is already established between the disk controller and the host computer.

Each HTRC 200 has buffer segment sharing mechanism 210 which contains a host buffer contents counter (HBCC) (see FIG. 7) that manages the quantity of sectors in the buffer segment across the entire context list that the HTRC 200 is retrieving. Thresholds are established for the HBCC. These thresholds are compared against the current value of the HBCC and used, along with other criteria to determine when the context should be enabled to start transferring on the SAS bus. If the threshold is met, the length of the instruction generated by the HTRC 200 may still be for less than the size of the original length to be transferred by the context. In this case, the HTRC will issue more than one instruction for the context. Once it is determined that an instruction should be issued by the HTRC 200, the HTRC 200 adjusts the context transfer length by the size of the issued instruction, measured in sectors, and increments the cluster count register by the size of the issued instruction, again measured in sectors. When this adjustment is complete, the instruction request is asserted.

The write context manager (WCM) 224 is the interface between HTRC 200 which contains a write context and the receive instruction block in SASPEN 218. The WCM 224 takes requests from HTRC 200 for sending write instructions for data, arbitrates between the requests, asserts a receive instruction request to SASPEN 218 for the winning request, copies the instruction to WDMA 226 and passes the acknowledgement for the instruction request from SASPEN 218 back to the originating HTRC.

The read context manager (RCM) 221 is the interface between the HTRCs containing read contexts and the transmit instruction block in SASPEN 218. RCM 221 takes requests from the HTRCs for sending read data and nexus information from SASPEN, arbitrates between the requests, loads the HTRC 200 instruction to the RCM 221, asserts a transmit instruction request to SASPEN for the winning request, copies the instruction to RDMA 220, and passes the acknowledgement for the instruction request from SASPEN 218 back to the originating HTRC 200.

The read DMA (RDMA) 220 is the interface between the data transmit block in SASPEN 218, the buffer 170 and the RCM 221. The RDMA 220, once loaded with an instruction, will transfer data from the buffer segment starting at the address pointer, specified in the instruction, to the data transmit block in SASPEN 218. The SASPEN 218 data transmit block formats this data for transmission on the SAS bus 230.

The write DMA (WDMA) 226 is the interface between the data receive block in SASPEN 218, the buffer 170 and the WCM 224. The WDMA 226, once loaded with an instruction, will transfer data from the data receive block in SASPEN 218 to the buffer segment starting at the address pointer specified in the instruction. The SASPEN 218 data receive block removes the protocol format from the data received from the SAS bus 230. The WDMA 226 may include storage to hold multiple instructions which can be switched to be active when data is received from SASPEN 218 for a given instruction pending in the WDMA 226.

As the WDMA 226 and RDMA 220 transfer data with a buffer segment, the disk interface 228 also transfers data with the same buffer segment. On a write transfer, data is transferred in order from the SAS bus 230, to the SASPEN 218 data receive block, to the WDMA 226, to the buffer 170, to the disk interface 228, and to the data storage medium 130. On a read transfer, data is transferred in order from the data storage medium 130, to the disk interface 228, to the buffer 170, to the RDMA 220, to the SASPEN 218 data transmit block, and to the SAS bus 230.

The HBCC is a variable that is loaded with the number of sectors available in the buffer segment for Disk Read operations or the amount of sectors already in the buffer for Disk Write operations (both are typically 0 for new read and write commands). The HBCC is decremented by the ClusCnt on reads and incremented by the ClusCnt on writes each time the HTRC 200 generates a request to the RCM 221 or WCM 224 and is incremented for reads and decremented for writes each time a sector is transferred correctly over the Disk interface 228 with the buffer 170. When the HBCC equals zero for reads, the buffer segment is empty; when the HBCC equals SegSize for writes, the buffer segment is full. Either of these conditions prevents the HTRC 200 from issuing further instructions to continue the DMA transfer. Read context management mechanism 208 also supports an option called read releasing. When a context is fetched into the HTRC 200, a field within the context can indicate to release a release length (REL_LEN) number of sectors from the buffer segment before processing the command. The REL_LEN number of sectors represents data that is in the buffer but is not requested by the Host Computer. The read context management mechanism 208 removes this data from the buffer before continuing to process the context by decrementing the HBCC by the REL_LEN and adjusting the host address pointer to the buffer to now point to the buffer location just after these discarded sectors. Once this adjustment is complete, then the HBCC can be used to determine if an instruction can be issued.

Thus, there is a situation where two DMA commands may be received in sequence, both being requests to read data. There is a small hole of data, such as a gap buffer segment of data, between the end of the buffer segment that includes the data requested by the first DMA request and the beginning of the buffer segment that stores the data requested by the second DMA request. When the second DMA request is received, the first step which determines the address pointer is modified to adjust the address pointer over this hole to skip the gap segment so that the address pointer skips the gap segment and points to the start of the second DMA request's data segment. Also, the HBCC, which is the current capacity of the buffer, is adjusted to release the sectors represented by this hole.

FIG. 3 depicts a high level flow chart that illustrates a data controller receiving a direct memory access (DMA) request from the host computer and generating a context for that request in accordance with the present invention. The process starts as depicted by block 300 and thereafter passes to block 302 which illustrates the data controller receiving a DMA command, such as a SCSI Read or Write command, from the host computer via the peripheral bus. Next, block 304 depicts the data controller parsing the DMA command. Block 306, then, illustrates the data controller generating a context for the received command. Then, block 308 depicts the data controller putting the context in a buffer, such as buffer 170 shown in FIG. 2. The process then passes back to block 302. The data controller may or may not receive assistance from microprocessor 160 to perform this flow.

FIGS. 4A through 4D together illustrate a high level flow chart that depicts the device of FIG. 2 efficiently processing DMA contexts in accordance with the present invention. The process starts as depicted by block 400 and thereafter passes to block 402 which illustrates the retrieval channel, referred to herein as the HTRC, receiving a pointer to the linked list of DMA contexts that exist in a buffer. Next, block 404 depicts the HTRC loading a context from the buffer into the HTRC's local registers. Then, block 405 depicts the HTRC performing the read release adjustment to the HBCC and host address pointer, if the context specifies that this operation is needed. Thereafter, block 406 illustrates the HTRC setting a transfer length variable equal to the total amount of data, that is specified by the context, to be transferred. Block 407, then, depicts the HTRC setting an instruction length variable equal to zero. This instruction length variable is sometimes referred to herein as the Cluster Count (ClusCnt).

The process then passes to block 408 which illustrates the HTRC determining whether the context is for a DMA read or DMA write. If a determination is made that the context is for a DMA write, the process passes to block 414 (see FIG. 4A). Referring again to block 408, if a determination is made that this context is for a DMA read, the process passes to block 448 (see FIG. 4D).

Block 414 depicts determining the size of the space in the buffer, e.g. SDRAM 170, that is currently available for storing data for this HTRC. This determination can be made by subtracting the HBCC from the segment size variable. Thereafter, block 416 illustrates a determination of whether or not a threshold configuration bit is set. When the threshold configuration bit is set, a comparison will be made to a preset threshold. When the threshold configuration bit is cleared, a comparison will be made to the current value of the transfer length variable. If a determination is made that the threshold configuration bit is cleared, i.e. not set, the process passes to block 418 which depicts a determination of whether or not the space currently available in the buffer segment is greater than the current value of the transfer length variable. If a determination is made that the space currently available in the buffer segment is not greater than the current value of the transfer length variable, the process passes to block 434. If a determination is made that the space currently available in the buffer segment is greater than the current value of the transfer length variable, the process passes to block 420 which illustrates the HTRC committing to issue a write instruction.

Next, block 422 depicts a determination of whether or not the current value of the transfer length variable is greater than the space currently available in the buffer segment. If a determination is made that the current value of the transfer length variable is greater than the space currently available in the buffer segment, the process passes to block 426 which illustrates setting the current value of the instruction length variable equal to the available space in the buffer segment, not to exceed the maximum burst transfer length. The process then passes to block 436 (see FIG. 4C). Referring again to block 422, if a determination is made that the current value of the transfer length variable is not greater than the space that is currently available in the buffer segment, the process passes to block 424 which depicts setting the current value of the instruction length variable equal to the transfer length variable, not to exceed the maximum burst transfer length. The process then passes to block 436 (see FIG. 4C).

Referring again to block 416, if a determination is made that the threshold configuration bit is set, the process passes to block 428 which illustrates a determination of whether a communications protocol connection is already established between the disk controller and the host computer. If a determination is made that a communications protocol connection is already established between the disk controller and the host computer, the process passes to block 430 which illustrates a determination of whether or not the space that is currently available in the buffer segment is greater than the connected write threshold. If a determination is made that the space that is currently available in the buffer segment is greater than the connected write threshold, the process passes to block 420. Referring again to block 430, if a determination is made that the space that is currently available in the buffer segment is not greater than the connected write threshold, the process passes to block 434. Block 434 depicts the HTRC not committing to issue a write command. The process then passes to block 408 (see FIG. 4A).

Referring again to block 428, if a determination is made that a communications protocol connection is not already established between the disk controller and the host computer, the process passes to block 432 which illustrates a determination of whether or not the space that is currently available in the buffer segment is greater than the not-connected write threshold. If a determination is made that the space that is currently available in the buffer segment is greater than the not-connected write threshold, the process passes to block 420. Referring again to block 432, if a determination is made that the space that is currently available in the buffer segment is not greater than the not-connected write threshold, the process passes to block 434.

Referring again to block 436 (see FIG. 4C), block 436 illustrates decrementing the current value of the transfer length variable by the current value of the instruction length variable. The current value of the transfer length variable now equals the amount of the data left over, if any, from the original DMA command that still needs to be transferred. Next, block 438 depicts adjusting the HBCC variable, which indicates the currently available data in the buffer segment, by the current value of the instruction length variable. Thereafter, block 440 illustrates determining the size of the length of the issued instruction in bytes. This is accomplished by multiplying the current value of the instruction length variable by the sector size. Then, block 442 depicts the HTRC asserting a request to issue the command to either the read context manager (RCM) if the context is for a read or the write context manager (WCM) if the context is for a write. Next, block 444 illustrates adjusting the host address pointer that points to the current location in the SDRAM 170 to now point to a new location in the SDRAM 170 buffer where the next instruction data will either be stored or read from.

Block 446, then, depicts a determination of whether or not the current value of the transfer length variable is zero. If a determination is made that the current value of the transfer length variable is zero, the process passes back to block 404 (see FIG. 4A). If a determination is made that the current value of the transfer length variable is not zero, the process passes back to block 408 (see FIG. 4A).

Referring again to block 448 (see FIG. 4D), block 448 illustrates a determination of the size of the data available, i.e. the value of the HBCC variable, in the buffer segment. Next, block 450 depicts a determination of whether or not the size of the data available in the buffer segment is greater than the current value of the transfer length variable. If a determination is made that the size of the data available in the buffer segment is greater than the value of the transfer length variable, the process passes to block 462. Referring again to block 450, if a determination is made that the size of the data available in the buffer segment is not greater than the current value of the transfer length variable, the process passes to block 454 which depicts a determination of whether or not a protocol communications connection has already been established between the disk controller and the host computer. If a determination is made that a protocol communications connection, i.e. an active connection, does not exist between the disk controller and the host computer, the process passes to block 458 which depicts a determination of whether the size of the data available in the buffer segment (HBCC) is greater than the not-connected read threshold.

If a determination is made that the size of the data available in the buffer segment (HBCC) is greater than the not-connected read threshold, the process passes to block 462.

Referring again to block 458, if a determination is made that the size of the data available in the buffer segment (HBCC) is not greater than the not-connected read threshold, the process passes to block 460 which depicts the HTRC not committing to issue a read instruction. The process then passes back to block 408 (see FIG. 4A). Referring again to block 454, if a determination is made that a protocol communication connection, i.e. an active connection, has already been established between the disk controller and the host computer, the process passes to block 456. Block 456 illustrates a determination of whether or not the size of the data available in the buffer segment (HBCC) is greater than the connected read threshold. If a determination is made that the size of the data available in the buffer segment (HBCC) is greater than the connected read threshold, the process passes to block 462. Referring again to block 456, if a determination is made that the size of the data available in the buffer segment (HBCC) is not greater than the connected read threshold, the process passes to block 460.

Block 462 illustrates the HTRC committing to issue a read instruction. Next, block 464 depicts a determination of whether or not the current value of the transfer length variable is greater than the data currently available in the buffer segment. If a determination is made that the current value of the transfer length variable is not greater than the data currently available in the buffer segment, the process passes to block 466 which illustrates setting the current value of the instruction length variable equal to the current value of the transfer length variable. The process then passes to block 436 (see FIG. 4C).

Referring again to block 464, if a determination is made that the current value of the transfer length variable is greater than the data currently available in the buffer segment, the process passes to block 468 which illustrates setting the current value of the instruction length variable equal to the size of the data that is currently available in the buffer segment not to exceed the maximum burst transfer length. The process then passes to block 436 (see FIG. 4C).

An important and useful property of the process shown in FIGS. 4A through 4D is that all steps within this process can be performed without feedback from the data movement blocks in the system, such as from WDMA 226 or RDMA 220. This allows the process to loop and issue multiple instructions without waiting for feedback from the data movement blocks. This can allow the blocks which handle these instructions to know about the multiple instructions in time to coalesce them onto the same communications protocol connection without creating undesirable delays between the data being transferred for each of these instructions. These delays are undesirable since they result in the communications protocol connection to this device being open for longer than necessary to transfer the data for these instructions. This results in delays to other devices on the SAS bus which are waiting for the current connection to close so they can open their own communications protocol connection to transfer their data. This equates to decreased overall system performance.

FIG. 4E illustrates a flow chart that depicts setting thresholds constants in accordance with the present invention. The process starts as illustrated by block 480 and thereafter passes to block 482 which depicts setting a connected write threshold. Next, block 484 illustrates setting a not-connected write threshold. Block 486, then, depicts setting a connected read threshold. Then, block 488 illustrates setting a not-connected read threshold. Thereafter, block 490 depicts setting or clearing a threshold configuration bit. Next, block 492 illustrates setting a maximum burst transfer length. The process then terminates as depicted by block 494. The process of FIG. 4E is typically performed by microprocessor 160.

FIG. 5 depicts a network data processing system which includes the present invention in accordance with the present invention. Network data processing system 500 is a network of computers in which the present invention may be implemented. Network data processing system 500 contains a network 502, which is the medium used to provide communications links between various devices and computers connected together within network data processing system 500. Network 502 may include connections, such as wire, wireless communication links, or fiber optic cables.

In the depicted example, a server 504 is connected to network 502 along with storage unit 506. In addition, clients 508, 510, and 512 also are connected to network 502. These clients 508, 510, and 512 may be, for example, personal computers, network computers, or other computing devices. In the depicted example, server 504 provides data, such as boot files, operating system images, and applications to clients 508-512. Clients 508, 510, and 512 are clients to server 504. Network data processing system 500 may include additional servers, clients, and other devices not shown. In the depicted example, network data processing system 500 is the Internet with network 502 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 500 also may be implemented as a number of different types of networks, such as for example, an intranet, a local area network (LAN), a wide area network (WAN), or a wireless network. FIG. 5 is intended as an example, and not as an architectural limitation for the present invention.

FIG. 6 is a block diagram that illustrates a host computer system that includes the present invention in accordance with the present invention. FIG. 6 is a more detailed illustration of a computer system that may be used to implement any of the computer systems of FIG. 5 in accordance with the present invention. Data processing system 600 may be a symmetric multiprocessor (SMP) system including a plurality of processors 602 and 604 connected to system bus 606. Alternatively, a single processor system may be employed. Also connected to system bus 606 is memory controller/cache 608, which provides an interface to local memory 609. I/O bus bridge 610 is connected to system bus 606 and provides an interface to I/O bus 612. Memory controller/cache 608 and I/O bus bridge 610 may be integrated as depicted.

Peripheral component interconnect (PCI) bus bridge 614 connected to I/O bus 612 provides an interface to PCI local bus 616. A number of modems may be connected to PCI bus 616. Communications links to network computers 508-512 in FIG. 5 may be provided through modem 618 and network adapter 620 connected to PCI local bus 616 through add-in boards.

Network adapter 620 includes a physical layer 682 which conditions analog signals to go out to the network, such as for example an Ethernet network over an R45 connector. A media access controller (MAC) 680 is included within network adapter 620. Media access controller (MAC) 680 is coupled to bus 616 and processes digital network signals. MAC 680 serves as an interface between bus 616 and physical layer 682.

Additional PCI bus bridges 622 and 624 provide interfaces for additional PCI buses 626 and 628, from which additional modems or network adapters may be supported. In this manner, data processing system 600 allows connections to multiple network computers. A memory-mapped graphics adapter 630 and hard disk 632 may also be connected to I/O bus 612 as depicted, either directly or indirectly.

Those of ordinary skill in the art will appreciate that the hardware depicted in FIG. 6 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 5 or 6.

FIG. 7 is a block diagram of a counter 700 that is used as a host buffer contents counter in accordance with the present invention. Counter 700 is a host buffer contents counter (HBCC). HBCC 700 is incremented or decremented in response to a receipt of various signals. HBCC 700 is decremented by a ClusCnt amount of data in response to receiving a cluster count read signal. A cluster count read signal indicates that a ClusCnt of read data has been committed to, and it occurs as the HTRC issues a read instruction to the RCM. HBCC 700 is incremented by a ClusCnt amount of data in response to receiving a cluster count write signal. A cluster count write signal indicates that a ClusCnt of write data has been committed to, and it occurs as the HTRC issues a write instruction to the WCM. HBCC 700 is incremented by one in response to receiving a read disk buffer release (DBR) signal. The read DBR signal is a signal that indicates that one sector of data has been copied to SDRAM 170 from the disk media 130 by the Disk Interface 228. HBCC 700 is decremented by one in response to receiving a write disk buffer release (DBR) signal. The write DBR signal is a signal that indicates that one sector of data has been copied to the disk media 130 from the SDRAM 170 by the Disk Interface 228. A MICRO signal may be received by HBCC 700 from microprocessor 160 to either increment or decrement HBCC 700. HBCC 700 is decremented by one in response to receiving a read release HBCC adjust signal 712. The read release HBCC adjust signal 712 is asserted REL_LEN times immediately after the context is fetched into the HTRC, which causes the HBCC to be decremented by REL_LEN.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data storage device that includes a data controller, said method comprising the steps of:
   receiving within said data storage device, from a peripheral device that is coupled to said data storage device, a direct memory access (DMA) command that requests a data transfer of a first amount of data;
   in response to said receiving of said direct access memory (DMA) command, performing each of steps (i)-(vii) independently of feedback from any DMA data movement block:
   (i) determining a current location in a buffer utilizing a host address pointer that points to said current location;
   (ii) determining a current capacity of said buffer for transferring data;
   (iii) determining whether said current capacity exceeds a threshold;
   (iv) generating an instruction, by said method in said data storage device, to transfer a second amount of data to complete at least a portion of said DMA command if it is determined that said current capacity exceeds said threshold;
   (v) adjusting said current capacity by said second amount of data;
   (vi) asserting said instruction; and
   (vii) adjusting said host address pointer by said second amount of data to point to a new current location.

2. The method according to claim 1, further comprising:
   generating a second instruction, by said method in said data storage device, to transfer a remaining amount of data to complete the rest of said DMA command.

3. The method according to claim 1, further comprising:
   receiving said DMA command via a communications protocol connection;
   generating a first instruction, by said method in said data storage device, to transfer said second amount of data, and opening a communications protocol connection between said peripheral device and said data storage device, if it is determined that said current capacity exceeds said threshold;
   adjusting said current capacity by said second amount of data;
   executing said first instruction utilizing said open communications protocol connection;
   generating a second instruction, by said method in said data storage device, to transfer a third amount of data if it is determined that said current capacity exceeds a second threshold, said second amount plus said third amount being equal to said first amount of data; and
   executing said second instruction utilizing said open communications protocol connection, said first and second instruction being executed utilizing the same open communications protocol connection without opening a second communications protocol connection.

4. The method according to claim 1, further comprising:
   utilizing said threshold when an open communications protocol connection already exists before said receiving of said DMA command; and
   maintaining a second threshold to use when an open communications protocol connection does not already exists before said receiving of said DMA command.

5. The method according to claim 1, further comprising:
   waiting until said current capacity exceeds said threshold prior to generating another instruction, by said method in said data storage device, to transfer a second amount of data to complete at least a portion of said DMA command.

6. The method according to claim 1, further comprising:
   receiving within a retrieval channel in said data controller in said data storage device, from a peripheral device that is coupled to said data storage device, a DMA command that requests a data transfer of a first amount of data;
   in response to said receiving of said DMA command, performing steps (viii)-(xiv) independently of feedback from any DMA data movement block:
   (viii) determining, by said retrieval channel, a current location in said buffer utilizing a host address pointer that points to said current location;
   (ix) determining, by said retrieval channel, a current capacity of said buffer for transferring data;
   (x) determining, by said retrieval channel, whether said current capacity exceeds a threshold;
   (xi) generating, by said retrieval channel, an instruction to transfer a second amount of data to complete at least a portion of said DMA command if it is determined that said current capacity exceeds said threshold;
   (xii) adjusting, by said retrieval channel, said current capacity by said second amount of data;
   (xiii) asserting, by said retrieval channel, said instruction; and
   (xiv) adjusting, by said retrieval channel, said host address pointer by said second amount of data to point to a new current location.

7. The method according to claim 1, further comprising:
   maintaining a transfer length variable;
   setting said threshold equal to a current value of said transfer length variable;
   setting said transfer length variable equal to said first amount of data in response to said receiving of said DMA command that requests a data transfer of a first amount of data;
   determining whether said current capacity exceeds said current value of said transfer length variable;
   generating an instruction, by said method in said data storage device, to transfer a second amount of data to complete a portion of said DMA command if it is determined that said current capacity exceeds said transfer length variable;
   asserting said instruction for execution;
   reducing a value of said transfer length variable by said second amount, said transfer length variable now being equal to a third amount of data;
   determining whether said current capacity exceeds said third amount of data; and
   generating a second instruction, by said method in said data storage device, to transfer said third amount of data to complete a remaining portion of said DMA command if it is determined that said current capacity exceeds said third amount of data.

8. The method according to claim 1, further comprising:
   maintaining a buffer variable that indicates a current capacity of said buffer;
   maintaining an instruction variable that indicates an amount of data to be transferred in response to execution of an instruction; and
   modifying said buffer variable by a current value of said instruction variable in response to a generation of said instruction.

9. The method according to claim 1, further comprising:
said DMA command being a request to write said first amount of data to said buffer;
determining said capacity of said buffer for transferring data by determining an amount of available space in said buffer for storing data;
determining whether said current capacity exceeds a threshold; and
generating an instruction, by said method in said data storage device, to write a second amount of data to complete at least a portion of said requested DMA transfer if it is determined that said current capacity exceeds said threshold.

10. The method according to claim 9, further comprising:
said DMA command being a request to read said first amount of data from said buffer;
determining said capacity of said buffer for transferring data by determining an amount of available data in said buffer that can be read from said buffer;
determining whether said current capacity exceeds a threshold; and
generating an instruction, by said method in said data storage device, to read a second amount of data to complete at least a portion of said requested DMA transfer if it is determined that said current capacity exceeds said threshold.

11. The method according to claim 1, further comprising:
said first DMA command being a command to read data from a first segment of said buffer;
processing said first DMA command;
receiving a second DMA command to read data from a second segment of said buffer, said first segment of said buffer being separated from said second segment of said buffer by a gap segment of said buffer in which data is stored;
determining a current location in said buffer utilizing said host address pointer by adjusting the host address pointer to skip said gap segment and to point to a beginning of said second segment of said buffer in response to a receipt of said second DMA command; and
determining a current capacity of said buffer by adjusting said current capacity to release said gap segment by making said gap segment available to store data.

12. A data controller in a storage drive, said data controller comprising:
a buffer for storing data transferred in response to execution of a direct memory access (DMA) transfer request;
a host address pointer pointing to a current location in said buffer;
a retrieval channel device included in said data controller; and
said retrieval channel device configured to:
fetch a context that describes a direct memory access (DMA) transfer requested by a host computer to which said storage drive is coupled, said DMA requesting a transfer of a particular amount of data;
determine a current capacity of said buffer for transferring data;
determine whether said current capacity exceeds a threshold;
generate an instruction to transfer a second amount of data to complete at least a portion of said requested DMA transfer in response to said retrieval channel device determining whether said current capacity exceeds said threshold;
adjust said current capacity by said second amount of data;
assert said instruction; and
adjust said host address pointer by said second amount of data.

13. A data storage device that includes a data controller, said data storage device comprising:
means for receiving from a peripheral device that is coupled to said data storage device a DMA command that requests a data transfer of a first amount of data;
means, responsive to said means for receiving, and performed independently of feedback from any DMA data movement block, for:
(i) determining a current location in said buffer utilizing a host address pointer that points to said current location;
(ii) determining a current capacity of said buffer for transferring data;
(iii) determining whether said current capacity exceeds a threshold;
(iv) generating an instruction, by said data controller, to transfer a second amount of data to complete at least a portion of said DMA command if it is determined that said current capacity exceeds said threshold;
(v) adjusting said current capacity by said second amount of data;
(vi) asserting said instruction; and
(vii) adjusting said host address pointer by said second amount of data to point to a new current location.

14. The data storage device according to claim 13, further comprising:
means for generating a second instruction, by said data controller, to transfer a remaining amount of data to complete the rest of said DMA command.

15. The data storage device according to claim 13, further comprising:
said communications protocol connection for receiving said DMA command;
means, responsive to said means for determining that said current capacity does exceed said threshold, for generating a first instruction, by said data controller, to transfer said second amount of data, and opening a communications protocol connection between said peripheral device and said data storage device, comprising;
means for adjusting said current capacity by said second amount of data;
means for executing said first instruction utilizing said open communications protocol connection;
means, responsive to said means for determining that said current capacity does exceed a second threshold, for generating a second instruction, by said data controller, to transfer a third amount of data, said second amount plus said third amount being equal to said first amount of data; and
means for executing said second instruction utilizing said open communications protocol connection, said first and second instruction being executed utilizing the same open communications protocol connection without opening a second communications protocol connection.

16. The data storage device according to claim 13, further comprising:
means for utilizing said threshold when an open communications protocol connection already exists before said receipt of said DMA command; and means for maintaining a second threshold to use when an open communications protocol connection does not already exists before said receipt of said DMA command.

17. The data storage device according to claim 13, further comprising:
means, responsive to said means for determining that said current capacity does not exceed said threshold, for waiting until said current capacity does exceed said threshold before generating an instruction, by said data controller, to transfer a second amount of data to complete at least a portion of said DMA command.

18. The data storage device according to claim 13, further comprising:
a retrieval channel in said data controller in said data storage device for receiving from a peripheral device that is coupled to said data storage device, a DMA command that requests a data transfer of a first amount of data;
means, responsive to said retrieval channel receiving said DMA command and performed independently of feedback from any DMA data movement block, for:
  (viii) determining, by said retrieval channel, a current location in said buffer utilizing a host address pointer that points to said current location;
  (ix) determining, by said retrieval channel, a current capacity of said buffer for transferring data;
  (x) determining, by said retrieval channel, whether said current capacity exceeds a threshold;
  (xi) generating, by said retrieval channel, an instruction to transfer a second amount of data to complete at least a portion of said DMA command in response to determining that said current capacity does exceed said threshold;
  (xii) adjusting, by said retrieval channel, said current capacity by said second amount of data;
  (xiii) asserting, by said retrieval channel, said instruction; and
  (xiv) adjusting, by said retrieval channel, said host address pointer by said second amount of data to point to a new current location.

19. The data storage device according to claim 13, further comprising:
a transfer length variable;
said threshold being set equal to a current value of said transfer length variable;
means, responsive to said receiving of said DMA command that requests a data transfer of a first amount of data, for setting said transfer length variable equal to said first amount of data;
means for determining whether said current capacity exceeds said current value of said transfer length variable;
means for generating an instruction to transfer a second amount of data to complete a portion of said DMA command in response to determining that said current capacity does exceed said transfer length variable;
means for asserting said instruction for execution;
means for reducing a value of said transfer length variable by said second amount, said transfer length variable now being equal to a third amount of data;
means for determining whether said current capacity exceeds said third amount of data; and
means for generating a second instruction to transfer said third amount of data to complete a remaining portion of said DMA command in response to determining that said current capacity does exceed said third amount of data.

20. The data storage device according to claim 13, further comprising:
a buffer variable that indicates a current capacity of said buffer;
an instruction variable that indicates an amount of data to be transferred by an instruction; and
means for modifying said buffer variable by a current value of said instruction variable in response to a generation of an instruction.

21. The data storage device according to claim 13, further comprising:
said DMA command being a request to write said first amount of data to said buffer;
means for determining said capacity of said buffer for transferring data by determining an amount of available space in said buffer for storing data;
means for determining whether said current capacity exceeds a threshold; and
means for generating an instruction to write a second amount of data to complete at least a portion of said requested DMA transfer in response to determining that said current capacity does exceed said threshold.

22. The data storage device according to claim 21, further comprising:
said DMA command being a request to read said first amount of data from said buffer;
means for determining said capacity of said buffer for transferring data by determining an amount of available data in said buffer that can be read from said buffer;
means for determining whether said current capacity exceeds a threshold; and
means for generating an instruction to read a second amount of data to complete at least a portion of said requested DMA transfer in response to determining that said current capacity does exceed said threshold.

23. The data storage device according to claim 13, further comprising:
said first DMA command being a command to read data from a first segment of said buffer;
said first DMA command;
means for receiving a second DMA command to read data from a second segment of said buffer, said first segment of said buffer being separated from said second segment of said buffer by a gap segment of said buffer in which data is stored;
means, responsive to a receipt of said second DMA command, for determining a current location in said buffer utilizing said host address pointer by adjusting the host address pointer to skip said gap segment and to point to a beginning of said second segment of said buffer; and
means for determining a current capacity of said buffer by adjusting said current capacity to release said gap segment by making said gap segment available to store data.

24. A computer program product in a data storage device that includes a data controller, said computer program product comprising:
instructions for receiving within said data storage device, from a peripheral device that is coupled to said data storage device, a DMA command that requests a data transfer of a first amount of data;
instructions, responsive to said instructions for receiving, for:
  (i) determining a current location in said buffer utilizing a host address pointer that points to said current location in said buffer;
  (ii) determining a current capacity of said buffer for transferring data;

(iii) determining whether said current capacity exceeds a threshold;
(iv) generating an instruction, by said data controller, to transfer a second amount of data to complete at least a portion of said DMA command if it is determined that said current capacity exceeds said threshold;
(v) adjusting said current capacity by said second amount of data;
(vi) asserting said instruction; and
(vii) adjusting said host address pointer by said second amount of data to point to a new current location.

* * * * *